(12) United States Patent
Hwang

(10) Patent No.: US 6,816,443 B1
(45) Date of Patent: Nov. 9, 2004

(54) APPARATUS FOR DISCRIMINATING OPTICAL DISC AND METHOD THEREFOR

(75) Inventor: Yong-Ha Hwang, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/537,754

(22) Filed: Mar. 30, 2000

(30) Foreign Application Priority Data

Mar. 30, 1999 (KR) ........................................ 1999-10952

(51) Int. Cl.$^7$ ................................................. G11B 7/00
(52) U.S. Cl. .................. 369/44.32; 369/53.22
(58) Field of Search .................... 369/44.34, 44.29, 369/112.02, 112.24, 53.33, 53.34, 47.53, 30.1, 59.17, 53.22, 44.23, 47.4, 44.32, 44.38, 166, 44.28, 59.11, 30.12, 53.28, 53.23, 53.42, 17, 33.22

(56) References Cited

U.S. PATENT DOCUMENTS

| | | | |
|---|---|---|---|
| 5,684,773 A | | 11/1997 | Hayashi |
| 6,298,024 B1 | * | 10/2001 | Nomura ..................... 369/126 |
| 6,333,907 B1 | * | 12/2001 | Iwata et al. ............... 369/53.24 |

FOREIGN PATENT DOCUMENTS

| | | | | |
|---|---|---|---|---|
| EP | 0 453 995 A2 | 10/1991 | ............ | G11B/7/00 |
| EP | 0 520 461 A2 | 12/1992 | ............ | G11B/7/09 |
| EP | 0 926 662 A2 | 6/1999 | ............ | G11B/7/00 |
| JP | 63-103471 | 5/1988 | | |
| JP | 3-173936 | 7/1991 | | |
| JP | 8-83465 | 3/1996 | | |

\* cited by examiner

*Primary Examiner*—Tan Dinh
*Assistant Examiner*—Kimlien Le
(74) *Attorney, Agent, or Firm*—Staas & Halsey LLP

(57) ABSTRACT

An optical disc discrimination apparatus and method which discriminate a type of a disc loaded on a DVD-RAM drive accurately and simply. The optical disc discrimination apparatus includes an RF envelope generator which detects an envelope signal from an RF signal read from a disc loaded in an optical disc recording and/or reproducing apparatus at an off-track state, when only a focusing is accomplished prior to performing a tracking control, an envelope amplitude detector which detects the amplitude of the detected envelope signal, and a disc discriminator which compares the amplitude of the detected envelope signal with predetermined reference level and discriminating whether the disc is a CD, a DVD-ROM, or a DVD-RAM, based on the comparison result. Thus, a type of the disc can be discriminated simply and accurately with a change in the amplitude of the RF signal.

24 Claims, 5 Drawing Sheets

APPARATUS FOR DISCRIMINATING OPTICAL DISC AND METHOD THEREFOR

CROSS-REFERENCE TO RELATED APPLICATIONS

This application claims the benefit of Korean Application No. 99-10952, filed Mar. 30, 1999, in the Korean Patent Office, the disclosure of which is incorporated herein by reference.

BACKGROUND OF THE INVENTION

1. Field of the Invention

The present invention relates to an apparatus for discriminating an optical disc and a method therefor, and more particularly, to an optical disc discrimination apparatus and method for discriminating an optical disc by using a size of an envelope of a radio frequency (RF) signal read from the optical disc at a state where only a focusing operation has been performed, to thereby discriminate the type of the optical disc accurately and conveniently.

2. Description of the Related Art

A digital versatile disc (DVD) can record a large amount of information and provide a high picture quality in comparison with a compact disc (CD). As a result, a DVD has come into the spotlight as a storage medium of the next generation. A recent form of the DVD is a DVD-RAM which provides functions of recording, deletion, and rewriting data on a medium, such as those of a RW (rewrite) disc. A DVD-RAM drive apparatus reproducing the DVD-RAM includes an optical pickup compatible with a DVD and a CD so that signals recorded on a DVD-ROM as well as the DVD-RAM and the CD having a relatively large track pitch, can be reproduced. Track structures of the discs which can be reproduced from the DVD-RAM drive apparatus are shown in FIGS. 1A through 1C.

Figure 1A:
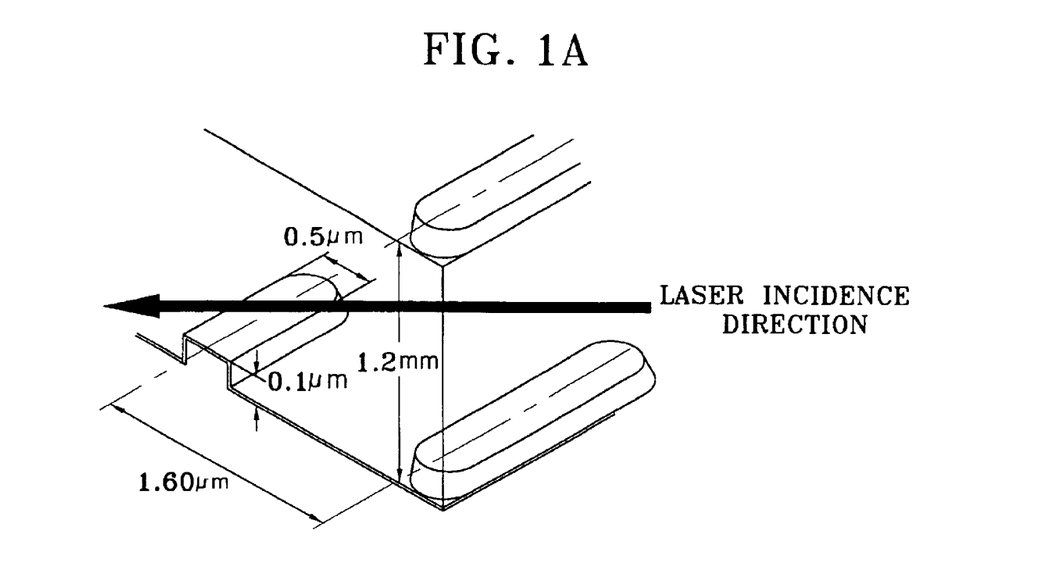
FIGS. 1A through 1C show the track structures of a CD, a DVD-ROM and a DVD-RAM, respectively.
Figure 1B:
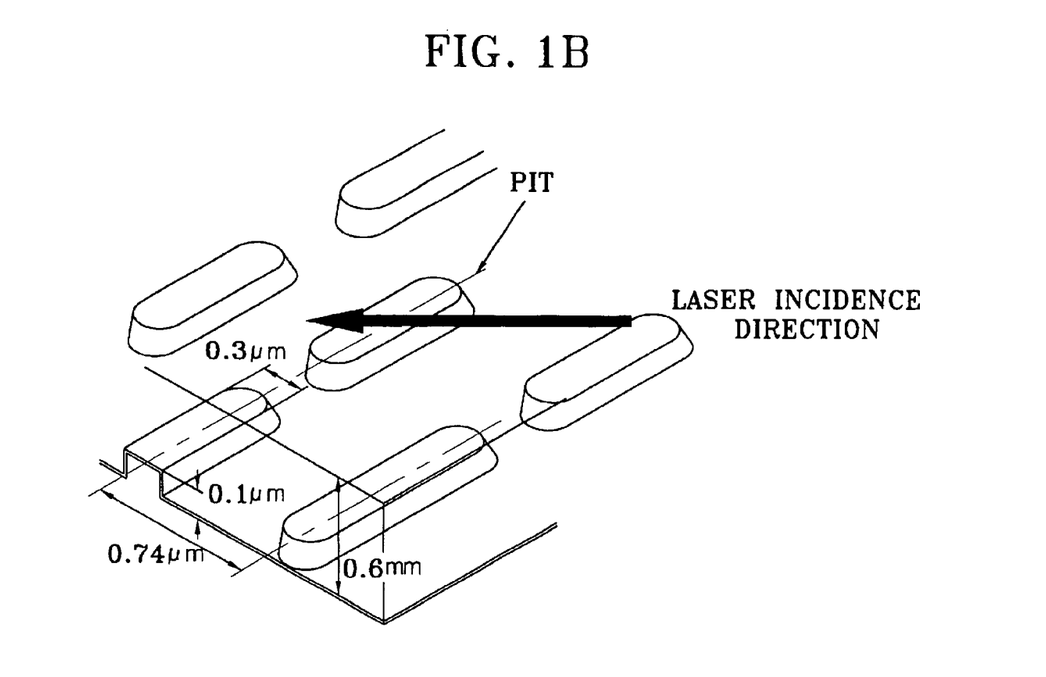
Figure 1C:
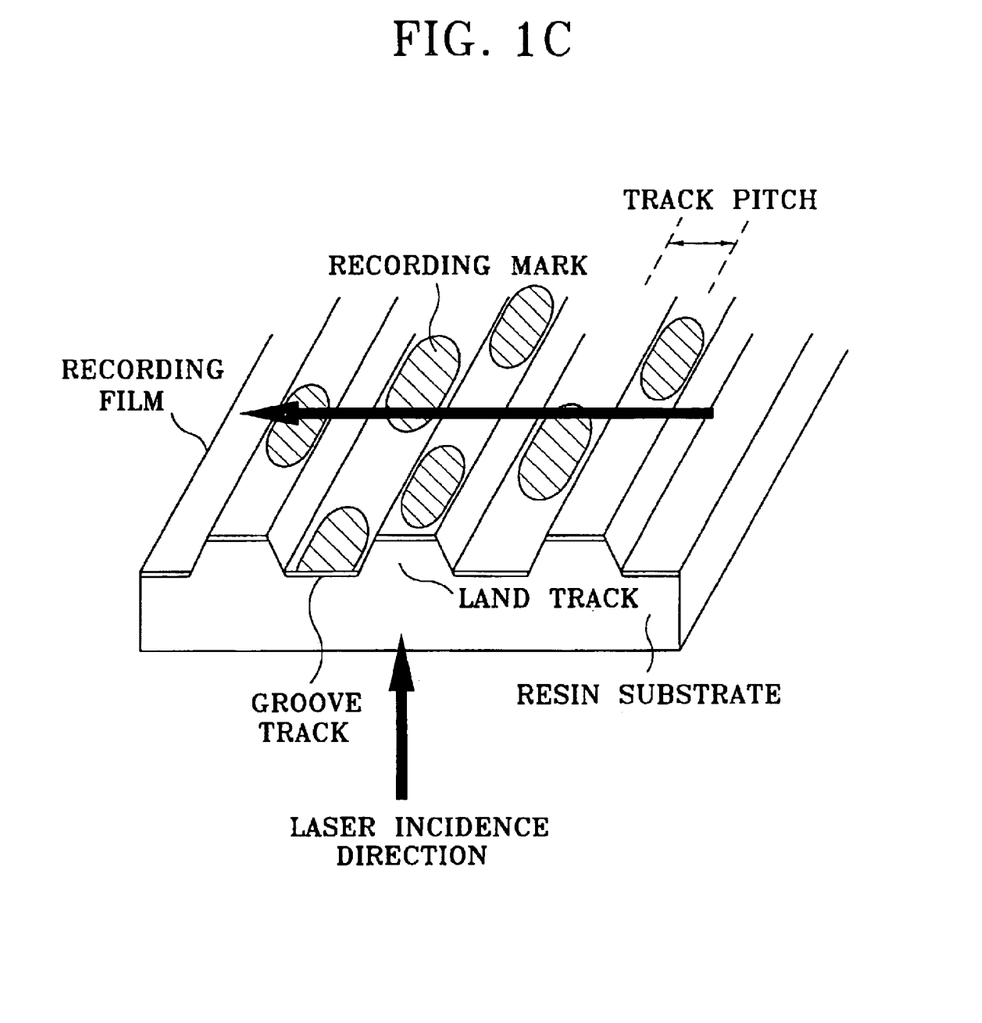

FIGS. 1A through 1C show the track structures of a CD, a DVD-ROM and a DVD-RAM, respectively. In the CD of FIG. 1A and the DVD-ROM of FIG. 1B, a pit is engraved to a depth of approximately 0.1 in a helical fashion from the center of the disc on a single mirror plane. Here, a track pitch is about 1.6 $\mu$m in the case of a CD and about 0.74 $\mu$m in case of a DVD-ROM. The DVD-RAM of FIG. 1C is configured as a land/groove track structure having a difference of about 6/$\mu$ in depth. Data can he recorded on both the land and the groove. Since a recording method of the DVD-RAM adopts a change in phase, a data pit region does not have a physical depth as a CD or a DVD-ROM.

An optical disc reproduction apparatus which can reproduce a CD, a DVD-ROM and a DVD-RAM having respectively different track structure as described above should discriminate whether a loaded disc is a DVD-RAM, a DVD-ROM or a CD prior to reproducing a signal from the loaded disc.

SUMMARY OF THE INVENTION

Thus, it is an object of the present invention to provide an optical disc discrimination apparatus and method for discriminating a type of a disc according to a difference in amplitude of an envelope waveform of a radio frequency (RF) signal read from the disc at a state where only a focusing operation is performed.

Additional objects and advantages of the invention will be set forth in part in the description which follows and, in part, will be obvious from the description, or may be learned by practice of the invention.

To accomplish the above and other objects of the present invention, there is provided an optical disc discrimination apparatus for use in an optical disc reproducer which can reproduce a plurality of different types of discs with only a single optical pickup, the optical disc discrimination apparatus comprising: an RF envelope generator which detects an envelope signal from an RF signal read from a loaded one of the discs; and a controller which detects an amplitude of the envelope signal detected by the RF envelope generator at an off-track state, and which discriminates the type of the disc using the detected amplitude.

There is also provided an optical disc discrimination method of discriminating a type of a disc for use in an optical disc reproducer which can reproduce a plurality of different types of discs with only a single optical pickup, the optical disc discrimination method comprising: (a) obtaining an envelope signal from an RF signal detected from a loaded one of discs at an off-track state of the disc; (b) detecting an amplitude of the envelope signal obtained in the step (a); (c) comparing the amplitude of the envelope signal detected in the step (b) with a predetermined reference level; and (d) discriminating whether the disc is a CD, a DVD-ROM, or a DVD-RAM based on the comparison result of the step (c).

BRIEF DESCRIPTION OF THE DRAWINGS

The above and other objects and advantages of the present invention will become more apparent by describing the preferred embodiments thereof in more detail with reference to the accompanying drawings in which.

DESCRIPTION OF THE PREFERRED EMBODIMENT

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
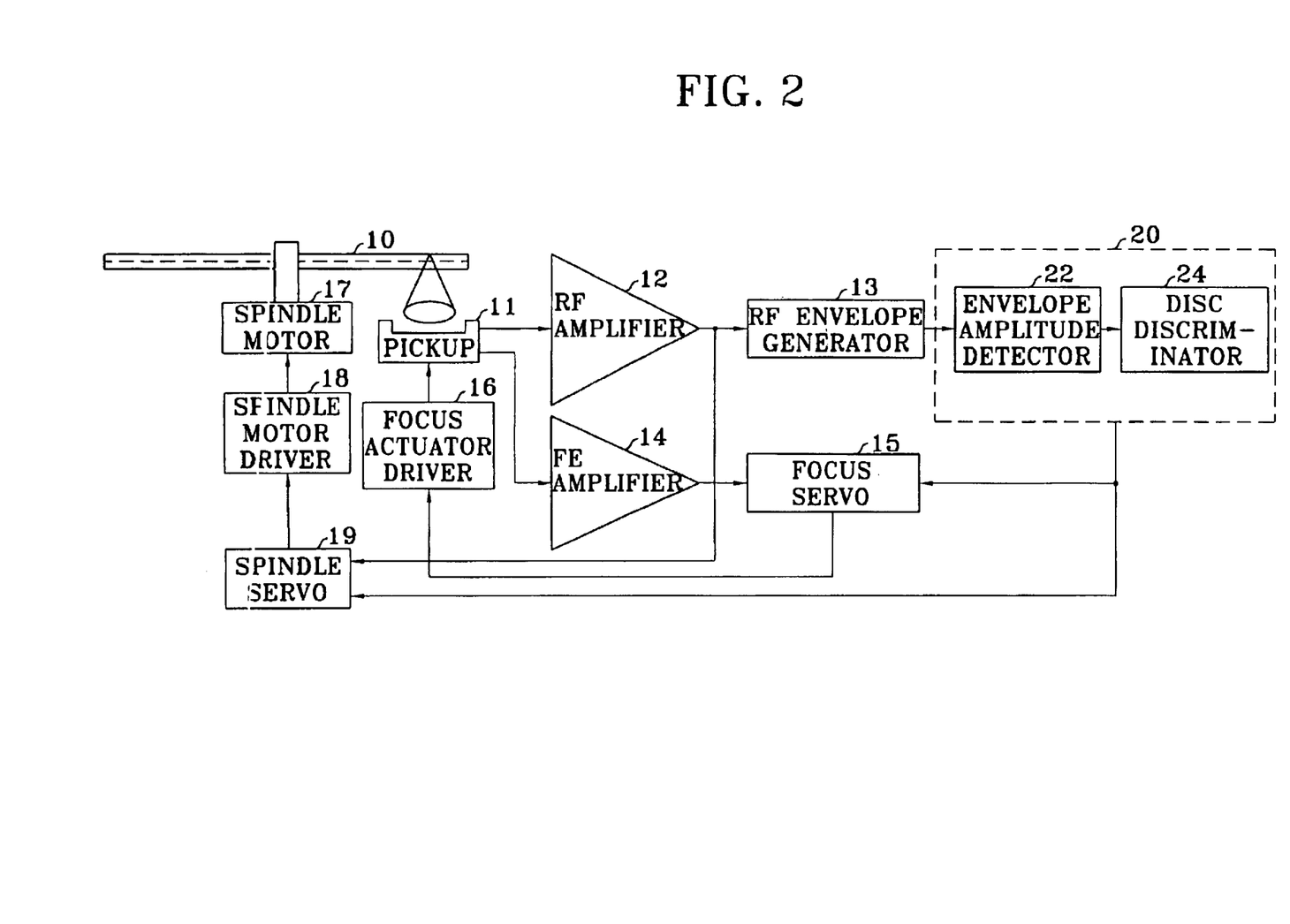
FIG. 2 shows a configuration of an optical disc discrimination apparatus according to an embodiment of the present invention.

FIG. 2 shows a configuration of an optical disc discrimination apparatus according to a preferred embodiment of the present invention. The apparatus shown in FIG. 2 includes an optical pickup 11 which reads out an RF signal from an optical disc 10 loaded on a disc drive (not shown), and an RF amplifier 12 which amplifies the RF signal which is a high-frequency signal read through the optical pickup 11. An RF envelope generator 13 receives the amplified RF signal from the RF amplifier 12 and detects and generates an envelope. The optical disc discrimination apparatus shown in FIG. 2 also includes a focus error (FE) amplifier 14 which amplifies an FE signal detected from the RF signal through the optical pickup 11, and a focus servo 15 which receives the amplified FE signal from the FE amplifier 14 and generates a control signal for a focus servo control operation. A focus actuator driver 16 drives a focus actuator in the optical pickup 11 in correspondence with the focus servo control signal. Meanwhile, the optical disc discrimination apparatus shown in FIG. 2 also includes a spindle servo 19 which generates a rotation control signal for a rotation control operation of the optical disc 10 using a reproduction clock of the RF amplifier 12 and a spindle motor driver 18 which drives a spindle motor 17 for rotating the optical disc 10 in correspondence with the rotation control signal of the spindle servo 19. A controller 20 controls the entire operation of the focus servo 15 and the spindle servo 19. The controller 20 includes an envelope amplitude detector 22 which receives the RF envelope signal generated from the RF envelope generator 13 via an analog-to-digital converter (not shown) and detects an amplitude of the received RF envelope signal, and a disc discriminator 24 which discriminates a type of the optical disc 10 using the amplitude of the RF envelope signal detected by the envelope amplitude detector 22. The optical disc discrimination operation of the optical disc discrimination apparatus shown in FIG. 2 having the above configuration will be described in more detail with reference to FIGS. 3A through 3C and FIGS. 4A through 4C.

When an optical disc such as a CD, a DVD-ROM or a DVD-RAM is loaded in an optical disc recording and/or reproducing apparatus, the controller 20 applies a command which controls a servo operation to the focus servo 15 and the spindle servo 19. The spindle servo 19 drives the spindle motor driver 18 by the command of the controller 20 to rotate the spindle motor 17 at a constant angular velocity and, thus rotate the optical disc 10 at a constant velocity. The focus servo 15 drives the focus actuator driver 16 by the command of the controller 20 to move an objective lens (not shown) in the optical pickup 11 up and down and perform a focusing by trying a focus-in operation. Here, the controller 20 controls rotation of the optical disc 10 so that it is not fast, to thereby maintain a focusing state with respect to all types of discs which are reproducible by the optical disc recording and/or reproducing apparatus.

The optical pickup 11 reads an RF signal from a rotating optical disc 10 and outputs the read RF to the RF amplifier 12. The RF amplifier 12 amplifies the input RF signal at a predetermined magnitude and then outputs it to the RF envelope generator 13. The output of the RF amplifier 12 is shown in FIGS. 3A through 3C.

Figure 3A:
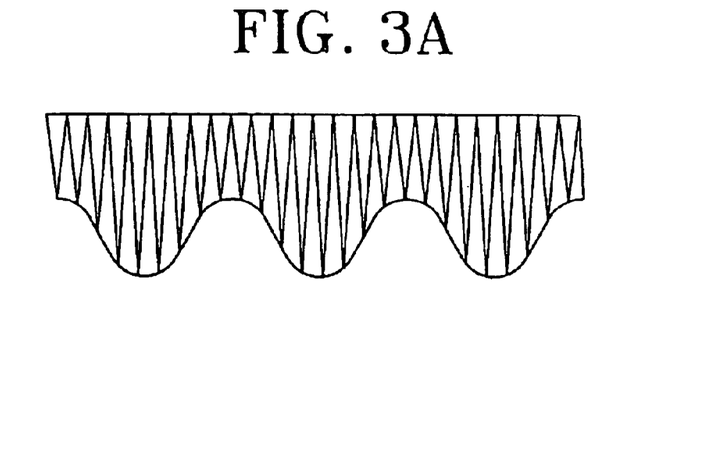
FIGS. 3A through 3C are waveform diagrams of an RF signal read from the discs shown in FIGS. 1A through 1C, respectively, at an off-track state.
Figure 3B:
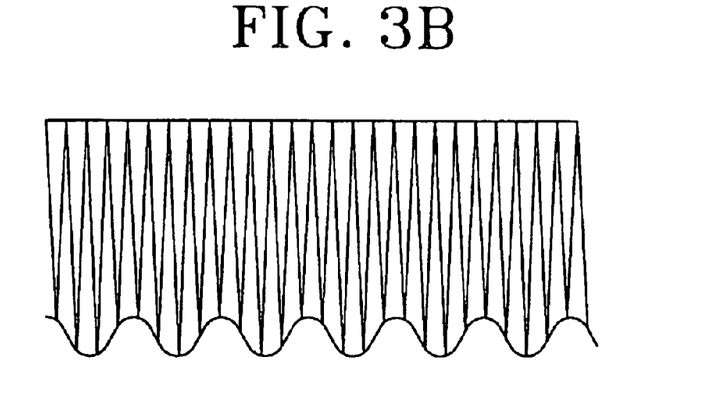
Figure 3C:
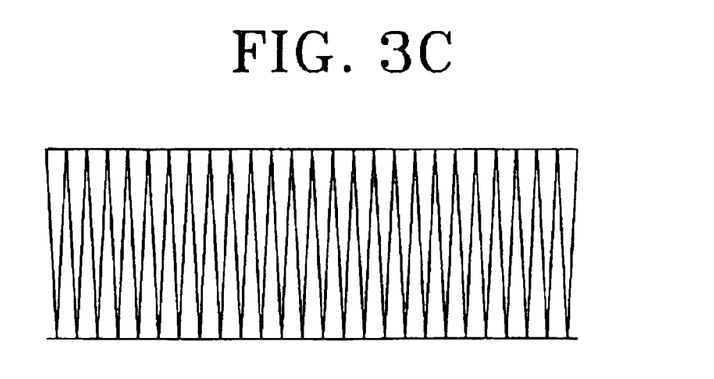

FIGS. 3A through 3C are waveform diagrams of an RF signal read from each of the discs shown in FIGS. 1A through 1C, respectively, and amplified in the RF amplifier 12 at an off-track state. Here, the off-track state means a state where only a focusing is performed before a tracking control is performed. At the off-track state, an optical beam traverses a plurality of tracks during a single rotation of a disc according to an amount of eccentricity of the disc. In the case that a reliability problem is raised due to a small amount of eccentricity of the disc, a sled can be moved so that the optical beam traverses a plurality of tracks.

In this embodiment, a laser wavelength is initialized to 635–650 nm for use in a DVD so that a loaded disc has the substantially same beam spot size irrespective of the fact that the loaded disc is a CD or a DVD-ROM. Here, since the track pitch of the CD is not less than two times greater than that of the DVD-ROM, referring to FIGS. 1A and 1B, an amplitude of RF signals of the adjacent tracks, which is detected when a beam spot is positioned between the tracks in case of a CD, becomes relatively smaller than that in the case of a DVD-ROM. In the case of both a CD and a DVD-ROM, the amplitude of the RF signal becomes large in a track area where data pits exist, and becomes small between the tracks, referring to FIGS. 3A and 3B. Meanwhile, data is recorded on both a land and a groove in case of a DVD-RAM. When a depth between a land and a groove is 6/λ, a cross-talk can be minimized. Accordingly, although an optical beam traverses each track, there is no change in the amplitude of the RF signal, referring to FIG. 3C.

As described above, the amplitude of the RF signal varies according to the type of the discs loaded in the optical disc recording and/or reproducing apparatus. The present invention discriminates a type of the disc using the above feature.

The RF envelope generator 13 detects an envelope signal by a peak hold and a bottom hold of the input RF signal, and outputs the detected result to the controller 20. The controller 20 converts the input analog envelope signal into a digital form via an analog-to-digital converter (not shown) and applies the converted result to the envelope amplitude detector 22. The envelope amplitude detector 22 samples the envelope signal between a maximum value ENVmax and a minimum value ENVmin into n sample signals at a zero cross interval of the applied envelope signal. The envelope amplitude detector 22 detects the magnitude of the n peak-to-peak values of the sampled envelope signal, and then obtains an average value ENVp-p, which is expressed by the following equation (1).

$$ENVp\text{-}p = \frac{\sum [ENV\max - ENV\min]}{n} \quad (1)$$

Figure 4A:
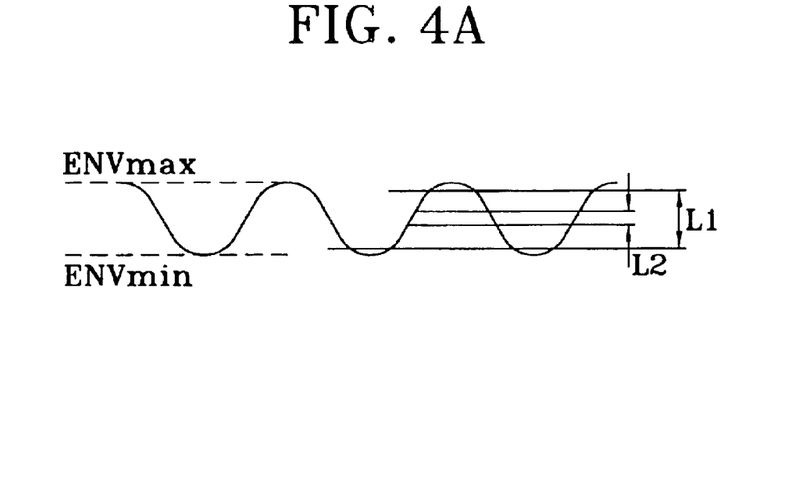
FIGS. 4A through 4C are waveform diagrams of envelope signals detected from the RF signals shown in FIGS. 3A through 3C, respectively.
Figure 4B:
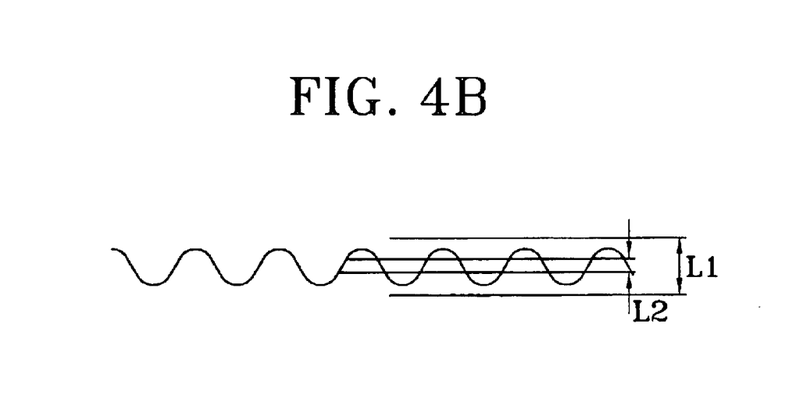
Figure 4C:
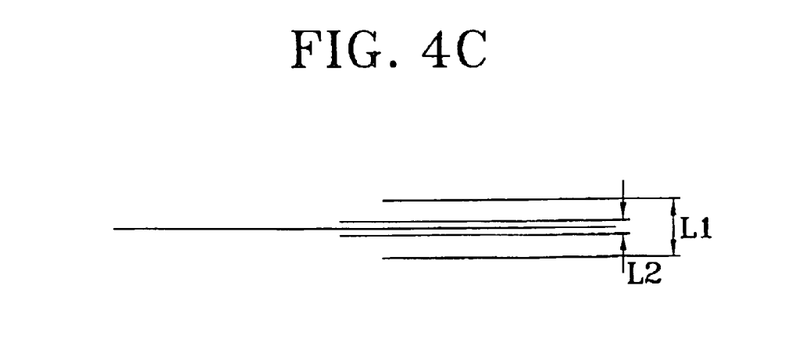

The envelope amplitude detector 22 outputs the average value ENVp-p obtained using the above equation (1) to a disc discriminator 24. The disc discriminator 24 compares an average value ENVp-p of the input envelope amplitude with predetermined reference levels, to perform discrimination of the disc. Here, the predetermined reference levels are used for discriminating a CD, a DVD-ROM or a DVD-RAM each of which RF signal amplitude differs from each other, and are set as shown in FIGS. 4A through 4C. The disc discriminator 24 compares the average value ENVp-p of the detected envelope amplitude with a first reference level L1. As a result of this comparison, if the average value ENVp-p of the envelope amplitude is larger than a first reference level L1 as shown in FIG. 4A, that is, ENVp-p>L1, it is discriminated that the currently loaded disc is a CD. If the average value ENVp-p of the envelope amplitude is smaller than the first reference level L1, the disc discriminator 24 compares the average value ENVp-p of the envelope amplitude with a second reference level L2. If the average value ENVp-p of the envelope amplitude is larger than the second reference level L2 as shown in FIG. 4B, that is, L1>ENVp-p>L2, it is discriminated that the currently loaded disc is a DVD-ROM. As a result of comparison, if the average value ENVp-p of the envelope amplitude is smaller than the second reference level L2 as shown in FIG. 4C, that is, L2>ENVp-p, it is discriminated that the currently loaded disc is a DVD-RAM. Here, the first reference level L1 is larger than the second reference level L2. The controller 20 controls the entire system so that a reproduction operation corresponding to a loaded disc can be performed according to a disc type discrimination result of the disc discriminator 24.

In addition to the above embodiment, a digital servo circuit including an analog-to-digital converter and a digital signal processor DSP detects the amplitude of the RF envelope signal and then transmits the amplitude data or an optical disc discrimination result to a controller such as a microcomputer.

As described above, the optical disc discrimination apparatus and method can discriminate whether the type of a loaded disc is a DVD-RAM, a DVD-ROM or a CD accurately and simply through a method of measuring the amplitude of the RF envelope at the state where only a focusing is accomplished when the loaded disc is loaded on a DVD-RAM drive having an optical pickup compatible with different types of optical discs.

Although a preferred embodiment of the present inventors has been shown and described, it would be appreciated by those skilled in the art that changes may be made in these embodiments without departing from the principles and spirit of the invention, the scope of which is defined in the claims and their equivalents.

What is claimed is:

1. An optical disc discrimination apparatus for use in an optical disc reproducer which reproduces data from a plurality of different types of discs with a single optical pickup, the optical disc discrimination apparatus comprising:

an RF envelope generator generating an envelope signal from an RF signal read from one of the discs which is loaded in the optical disc reproducer; and a controller detecting an amplitude of the envelope signal at an off-track state of the loaded disc, and discriminates the type of the loaded disc using the detected amplitude, wherein said controller comprises:

an envelope amplitude detector detecting the amplitude of the envelope signal and sampling the envelope signal between a maximum value and a minimum value into n sample signals at a zero cross interval, and obtaining an average value of the obtained n peak-to-peak values as the detected amplitude, and a disc discriminator comparing a level of the detected amplitude with at least one predetermined reference level and discriminating whether the loaded disc is a CD, a DVD-ROM, or a DVD-RAM, based on the comparison.

2. The optical disc discrimination apparatus of claim 1, wherein said RF envelope generator generates the envelope signal by a peak hold and a bottom hold of the RF signal read from the loaded disc.

3. The optical disc discrimination apparatus of claim 1, wherein said off-track state is a state where only a focusing is accomplished before a tracking control of the loaded disc is performed.

4. The optical disc discrimination apparatus of claim 1, wherein said at least one predetermined reference level is set based on conditions that a CD has a track pitch relatively larger than a DVD-ROM, thus having a larger change in the amplitude of the RF signal as an optical beam emitted by the optical disc reproducer traverses tracks thereof, and that a DVD-RAM has no change in the amplitude of the RF signal as the optical beam emitted by the optical disc reproducer traverses the tracks thereof.

5. The optical disc discrimination apparatus of claim 4, wherein said disc discriminator discriminates whether:

the loaded disc is the CD if a level of the detected envelope amplitude is larger than a first one of the at least one predetermined reference level;

the loaded disc is the DVD-ROM if the level of the detected envelope amplitude is smaller than the first predetermined reference level and larger than a second one of the at least one predetermined reference level; and the loaded disc is the DVD-RAM if the level of the detected envelope amplitude is smaller that the second predetermined reference level.

6. The optical disc discrimination apparatus of claim 1, wherein said envelope amplitude detector detects a magnitude of peak-to-peak values of the n sample signals, and obtains the average value of the peak-to-peak values to determine the detected amplitude.

7. The optical disc discrimination apparatus of claim 6, wherein said envelope amplitude detector obtains the average value, represented by $ENV_{p-p}$, in accordance with the equation:

$$ENV_{p-p} = \frac{\sum [ENV_{max} - ENV_{min}]}{n} \quad (1)$$

wherein n is the predetermined number of samples, $ENV_{max}$ is the maximum value and $ENV_{min}$ the minimum value.

8. The optical disc discrimination apparatus of claim 3, wherein said controller controls rotation of the loaded disc at a speed slow enough to maintain a focusing state with respect to each of the plurality of different types of discs in the off-track state.

9. The optical disc discrimination apparatus of claim 1, wherein said controller controls rotation of the loaded disc at a speed slow enough to maintain a focusing state with respect to each of the CD, DVD-ROM and DVD-RAM in the off-track state.

10. An optical disc discrimination method of discriminating a type of a disc for use in an optical disc reproducer which reproduces data from a plurality of discs with only a single optical pickup, the optical disc discrimination method comprising:

obtaining an envelope signal from an RF signal detected from one of discs which is loaded in the optical disc reproducer, at an off-track state of the loaded disc;

detecting an amplitude of the envelope signal comprising
      sampling the envelope signal between a maximum value and a minimum value into a predetermined number of sample signals at a zero cross interval,
      detecting the predetermined number of sample signals, and
      obtaining an average value of the detected predetermined number of sample signals to detect the amplitude;

comparing the amplitude of the envelope signal with at least one predetermined reference level; and discriminating whether the loaded disc is a CD, a DVD-ROM, or a DVD-RAM based on the comparison.

11. The optical disc discrimination method of claim 10, wherein said discriminating of the loaded disc as the CD, the DVD-ROM or the DVD-RAM, is based upon a condition that a change in the RF signal amplitudes as an optical beam of the optical disc reproducer moves across tracks thereof differs from each other in the CD, the DVD-ROM, and the DVD-RAM, wherein, a first one of the at least one predetermined reference level is larger than the amplitude of the RF signal detected from the CD, and a second one of the at least one predetermined reference level is smaller than the first predetermined reference level and larger than the amplitude of the RF signal detected from the DVD-ROM.

12. The optical disc discrimination method of claim 11, wherein said discriminating comprises:

discriminating that the loaded disc is the CD if the amplitude of the envelope signal detected from the RF signal is larger than the first predetermined reference level;

discriminating that the loaded disc is the DVD-ROM if the amplitude of the envelope signal detected from the RF signal is smaller than the first predetermined reference level and larger than the second predetermined reference level; and discriminating that the loaded disc is the DVD-RAM if the amplitude of the envelope signal detected from the RF signal is smaller that the second predetermined reference level.

13. The optical disc discrimination method of claim 10, wherein:

the detecting of the predetermined number of sample signals comprises detecting a magnitude of peak-to-peak values of the predetermined number of samples; and the obtaining of the average value comprises obtaining the average value of the peak-to-peak values to detect the amplitude of the envelope signal.

14. The optical disc discrimination method of claim 13, wherein the obtaining of the average value, represented by $ENV_{p\text{-}p}$, is determined in accordance with the equation:

$$ENVp\text{-}p = \frac{\sum [ENV\max - ENV\min]}{n} \quad (1)$$

wherein n is the predetermined number of samples, $ENV_{max}$ is the maximum value and $ENV_{min}$ is the minimum value.

15. The optical disc discrimination method of claim 10, further comprising:

controlling a rotation of the loaded disc at a speed slow enough to maintain a focusing state with respect to each of the plurality of different types of discs in the off-track state.

16. The optical disc discrimination method of claim 10, further comprising:

controlling a rotation of the loaded disc at a speed slow enough to maintain a focusing state with respect to each of the CD, DVD-ROM and DVD-RAM in the off-track state.

17. An optical reproducer which reproduces data from a plurality of different types of discs using a single optical pickup, the optical disc discrimination apparatus comprising:

a data reproducing device which reproduces the data by illuminating an optical beam on a loaded one of the optical discs, receive the reflected optical beam, to generate an RF signal;

an RF envelope generator which generates an envelope signal from the RF signal; and a controller which detects an amplitude of the envelope signal only when a focusing operation of the disc is being performed prior to a tracking control operation of the disc being performed, to discriminate the type of the loaded disc, wherein the controller controls the reproduction of the disc in accordance with the discriminated disc type.

18. The optical reproducer of claim 17, wherein said controller controls rotation of the loaded disc at a speed slow enough to maintain a focusing state with respect to each of the plurality of different types of discs during the focusing operation.

19. The optical reproducer of claim 17, wherein the optical beam is initialized to 635–650 nm during the focusing operation of the disc performed prior to the tracking control operation of the disc.

20. The optical reproducer of claim 17, further comprising:

an RF amplifier to amplify the RF signal output from the data reproducing device;

a focusing servo to output a focus control signal in accordance with a focus error signal of the RF signal and the discriminated disc type; a pickup actuator to drive the data reproducing device for focusing based upon the focus control signal;

a spindle motor to rotate the loaded disc in accordance with a servo control signal; and a spindle servo to generate the servo control signal in accordance with the discriminated disc type and the amplified RF signal.

21. An optical disc reproduction method of reproducing data from a plurality of different types of discs using a single optical pickup, the optical disc reproduction method comprising:

reproducing the data by illuminating an optical beam on a loaded one of the optical discs, receive the reflected optical beam, to generate an RF signal;

generating an envelope signal from the RF signal; and detecting an amplitude of the envelope signal only when a focusing operation of the disc is being performed prior to a tracking control operation of the disc being performed, to discriminate the type of the loaded disc, and controlling the reproduction of the disc in accordance with the discriminated disc type.

22. The optical disc reproduction method of claim 21, wherein the discriminating of the type of disc comprises comparing a level of the detected amplitude with at least one predetermined reference level and discriminating whether the loaded disc is a CD, A DVD-ROM, or a DVD-RAM, based upon the comparison.

23. The optical disc reproduction method of claim 21, further comprising controlling rotation of the loaded disc at a speed slow enough to maintain a focusing state with respect to each of the plurality of different types of discs during the focusing operation.

24. The optical disc reproduction method of claim 21, further comprising initializing the optical beam to 635–650 nm during the focusing operation of the disc performed prior to the tracking control operation of the disc.

* * * * *

UNITED STATES PATENT AND TRADEMARK OFFICE
CERTIFICATE OF CORRECTION

| | |
|---|---|
| PATENT NO. | : 6,816,443 B1 |
| DATED | : November 9, 2004 |
| INVENTOR(S) | : Yong-Ha Hwang |

Page 1 of 1

It is certified that error appears in the above-identified patent and that said Letters Patent is hereby corrected as shown below:

Column 7,
Line 8, change "that" to -- than --.

Signed and Sealed this

Twenty-first Day of February, 2006

JON W. DUDAS
*Director of the United States Patent and Trademark Office*